Oct. 23, 1956  H. W. CABLE  2,768,039
PISTON RING
Filed Feb. 3, 1954
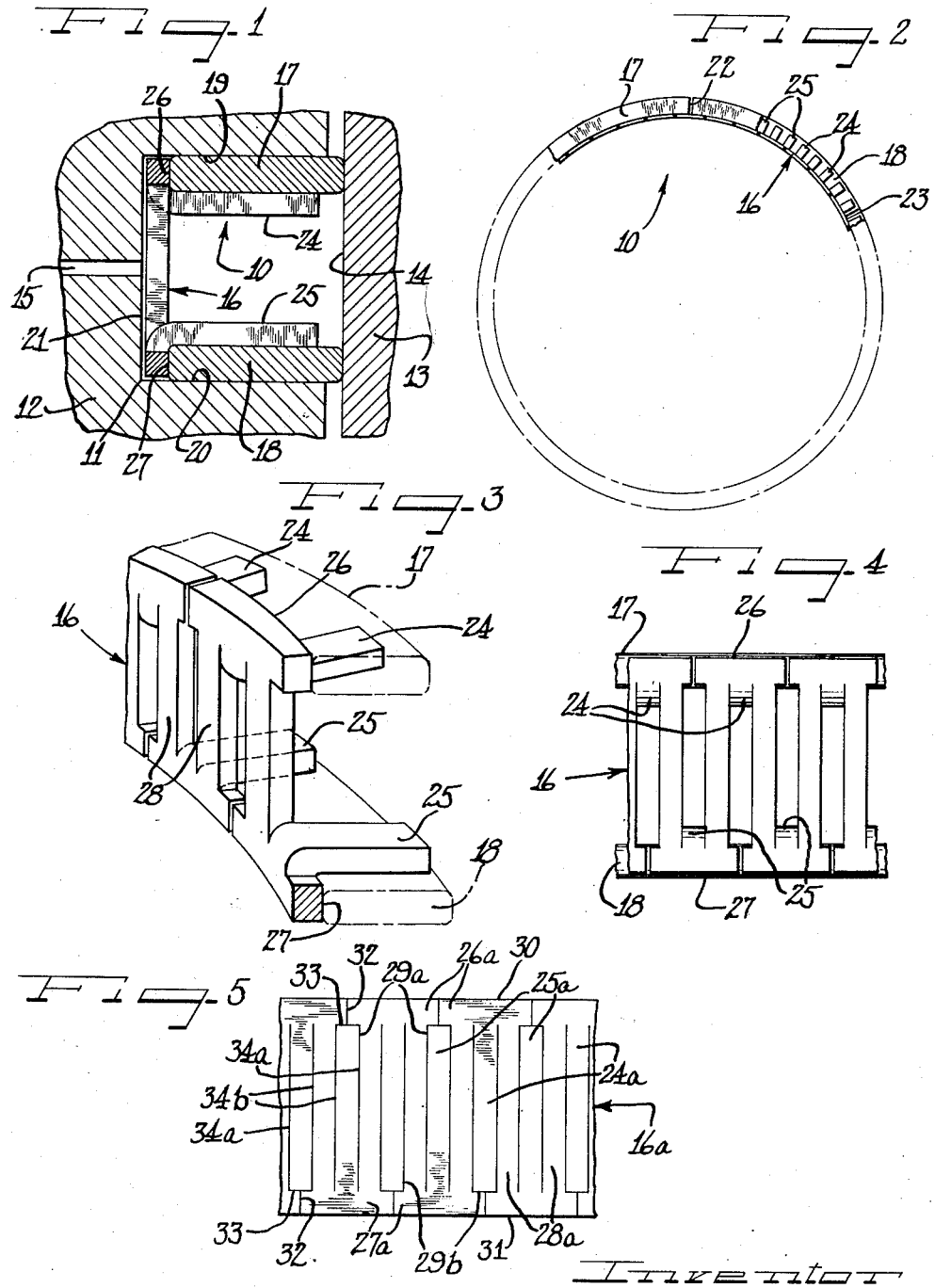
Inventor
Herbert W. Cable

United States Patent Office 2,768,039
Patented Oct. 23, 1956

2,768,039

PISTON RING

Herbert W. Cable, Cleveland Heights, Ohio, assignor to Thompson Products, Inc., Cleveland, Ohio, a corporation of Ohio Application February 3, 1954, Serial No. 407,841

7 Claims. (Cl. 309—24)

The present invention relates to a piston ring, and more particularly to a sealing ring assembly.

Still more particularly, the present invention relates to a sealing ring assembly for internal combustion engines and the like and to a new and improved expander-spacer ring in the sealing ring assembly.

In the pistons of an internal combustion engine, which is referred to herein by way of example only and is not intended to impose any limitations on the present invention, at least the lowermost ring or ring assembly is provided as an oil sealing ring to prevent oil or lubricant from flowing into the combustion chamber of the cylinder above the piston. Since this sealing ring is subject to extensive wear by reciprocation of the piston within the cylinder and by the continuous frictional wear of the ring against the cylinder wall, the sealing rings frequently have a short useful life after which they substantially fail to seal the combustion chamber from oil or other lubricant as well as is desired.

It is therefore an important object of the present invention to obviate these difficulties and to provide a new and improved sealing ring assembly in accordance with the principles of the present invention wherein the sealing members of the assembly are resiliently urged against the cylinder walls and wherein the sealing members are resiliently supported in the oil ring or sealing ring groove in the piston. Also, it is an important object of the present invention to provide a new and improved expander-spacer ring to resiliently support the sealing members or rail rings within the oil ring groove or sealing ring groove and against the cylinder wall.

Oil rings or sealing rings incorporating the principles of the present invention are provided with a resilient expander-spacer ring which resiliently seats within the oil ring or sealing ring groove of a piston and supports the rail rings resiliently urging the same against the radial faces of the oil ring groove and resiliently radially outwardly urges the oil rings or rail rings against the cylinder wall. An expander-spacer ring incorporating the principles of the present invention is resilient both in the manner of its support of the rail rings and in the manner of urging the rail rings radially outwardly, and may be manufactured and constructed with maximum economy and substantially without waste of materials. Such an expander-spacer ring may be formed from an elongated strip of suitable sheet metal or the like and provided with transverse substantially rectangular double tine fork-like cuts extending transversely across the strip and alternately inwardly from opposed edges thereof. After the strip is so transversely cut the portions of the strip lying between the tine-like cuts of each fork-like cut are bent outwardly to lie in substantially parallel planes on the same side of the strip and spaced inwardly from the opposed edges of the strip a distance less than the thickness of the rail rings or sealing members. Thereafter the strip is formed into a ring which is resilient and which may be slipped over the head of the piston and into the oil ring or sealing ring groove by virtue of its expandable and contractable characteristics.

Since the cuts in the strip were fork-like, the ring will be provided with transversely extending legs joined together in pairs by marginal portions having a length substantially equal to the spacing between alternate legs. By so cutting the strip first and second legs will be joined together at one end thereof while second and third legs will be joined together at the other end thereof and third and fourth legs will be joined together at the first mentioned end thereof.

By this construction the expander-spacer ring will be radially resilient while the outturned bent legs will be axially resilient. Therefore this expander-spacer ring incorporating the principles of the present invention will resiliently support sealing rail rings and will resiliently urge the same against a cylinder wall.

Accordingly, it is another important object of the present invention to provide a new and improved expander-spacer ring for an oil ring or sealing ring assembly and formed from an elongated strip having transversely extending rectangular double tine fork-like cuts therein.

Still another object of the present invention is to provide a new and improved expander-spacer ring formed substantially without waste of material and provided with supporting legs and abutment shoulders for spaced opposed rail rings.

Still another object of the present invention is to provide a new and improved method of construction for an expander-spacer ring for an oil ring or sealing ring assembly wherein an elongated strip of resilient sheet metal transversely cut or slit to have double tine fork-like cuts therein alternately extending inwardly from opposite edges thereof, bending the portions between the cuts of each of said fork-like cuts outwardly from the plane of said strip and into substantially parallel planes on the same side of said strip, and forming said strip into a ring.

Still other objects, features and advantages of the present invention will become readily apparent from the following detailed description of the present invention and a preferred embodiment thereof, from the claims, and from the accompanying drawings in which each and every detail shown is fully and completely disclosed as a part of this specification, in which like reference numerals refer to like parts, and in which:

Figure 1 is a segmental cross-section illustration of a piston and cylinder and a sealing ring or oil ring assembly incorporating the principles of the present invention;

Figure 2 is a segmental plan illustration of a sealing ring assembly such as the one shown in Figure 1;

Figure 3 is a segmental perspective illustration of the expander-spacer ring shown with phantom line outlined rail rings in a properly assembled position with the expander-spacer ring;

Figure 4 is a fragmental elevational view of the sealing ring assembly of Figures 1 and 2 shown from an axial position within the ring assembly; and Figure 5 is a plan illustration of a strip which has been slit or cut to be formed into an expander-spacer ring as shown in Figures 1 through 4.

As shown on the drawings:

There is shown in Figure 1 an oil ring or piston ring or piston ring assembly 10 incorporating the principles of the present invention and disposed in operating position in the oil ring or sealing ring groove 11 of a piston or the like 12 which is reciprocally disposed in a cylinder or block or the like 13 having a cylinder internal wall 14. Under ordinary operating conditions of, for example, an internal combustion engine, as the piston 12 reciprocates within the cylinder 13, it is highly desirable to maintain the combustion chamber within the cylinder and above the piston free from lubricating oil and the like which may be disposed below the piston 12. To keep the combustion chamber so free of lubricating oil and the like is the design purpose of such an assembly as the piston ring assembly 10. Should any of the lubricating oil or the like find its way to a position within the assembly 10, it is free to flow away therefrom through an oil drain port 15 radially communicating with the oil ring groove 11 and the piston 12.

The oil ring or sealing ring piston ring assembly 10 includes an expander-spacer ring 16 which supports and resiliently axially urges rail rings 17 and 18 against the upper and lower radial faces 19 and 20 respectively of the oil ring groove 11. The expander-spacer ring 16 is further operative to radially outwardly urge the rail rings 17 and 18 against the cylinder wall face 14 of the cylinder 13 to thereby compensate for any wear on the thin rail rings 17 and 18 and on the cylinder wall 14.

To this end the expander-spacer ring is axially dimensioned slightly less than the axial dimension of the inner axial face 21 of the oil ring groove 11 whereby it will not bind on the radial faces 19 and 20 but will abut the thin rail rings 17 and 18 to urge the same radially outwardly.

As will be hereinafter described, the expander-spacer ring 16 is circumferentially expandable. So that the thin rail rings 17 and 18 will also be circumferentially expandable whereby they may be expanded to compensate for wear, etc., as described, they are radially cut or split as at 22 and 23 respectively (note Figure 2).

Axial support for the thin rail rings 17 and 18 is provided by radially outwardly extending substantially parallel upper and lower ring supporting legs 24 and 25, respectively, which are formed integrally with the remainder of the expander-spacer ring. These ring supporting legs 24 and 25 are disposed in substantially parallel planes which are spaced inwardly from the upper and lower edge extremities of the expander-spacer ring thereby leaving abutment shoulders and abutment shoulder portions 26 and 27 facing radially against the thin rail rings 17 and 18 to resiliently urge the thin rail rings radially outwardly and against the cylinder wall face 14. To maintain the axially opposed abutment shoulders 26 and 27 properly spaced and to maintain the rail ring supportings legs 24 and 25 properly spaced, the expander-spacer ring 16 is provided with cross bars or cross legs 28 which are integral with the remainder of the expander-spacer ring and are formed as the material remaining between adjacently provided rail ring supporting legs.

These cross bars or cross legs 28 are joined together in successive pairs such that first and second thereof are integral with an upper abutment shoulder portion while second and third thereof are integral with a lower abutment shoulder portion and third and fourth thereof are again integral with an upper abutment shoulder portion, etc. and successively. The first mentioned abutment shoulder portion and the second upper abutment shoulder portion are separated by a slit or cut and successive lower abutment shoulder portions are separated by slits or cuts thereby permitting the expander-spacer ring 16 to have a peripherally expandable and resilient characteristic.

To form an expander-spacer ring in accordance with the principles of the present invention, an elongated strip of suitable resilient material such as sheet metal or the like, and indicated at 16a (Figure 5) is cut with transversely extending double tine fork-like cuts or slits 29a and 29b which alternately extend substantially across the width of the strip 16a from spaced opposed lateral edge portions 30 and 31 thereof. That is, these double tine fork-like cuts extend transversely across the strip 16a with the slits or cuts 29a being alternately disposed with the slits or cuts 29b and with the cuts 29a extending from the edge 30 while the slits or cuts 29b extend from the edge 31. Each of the several slits or cuts 29a and 29b extend less than the full width of the strip 16a and each is formed substantially rectangularly with a transversely outer stem-like cut 32 which T's with a relatively short longitudinal cut 33 from the extremities of which a pair of tine-like cuts 34a and 34b transversely extend across the strip 16a to the line of the longitudinally extending cuts 33 of the alternate fork-like cuts 29a and 29b.

When so cut or slit, the strip 16a is provided with marginal segments 26a along the edge 30 and marginal segments 27a along the edge 31. Also, the strip 16a will be provided with transversely extending cross legs or cross bars 28a between adjacent slits or cuts 29a and 29b, and transversely extending rail ring supporting legs 24a and 25a which are yet to be bent outwardly from the strip for complete formation of the expander-spacer ring.

Thereafter, the rail ring supporting leg portions 24a and 25a are bent outwardly from the strip 16a at the free extremities of the tine-like slits or cuts 34a and 34b so as to lie in substantially parallel planes on the same side of the strip 16a and substantially perpendicular thereto with the upper or outer surface of the leg 24 being spaced from the edge 30 a distance slightly less than the thickness of the rail ring 17 and with the lower or outer face of the lower leg 25 being spaced from the lower edge 31 a distance less than the thickness of the lower rail ring 17.

The strip 16a is then cut to an appropriate length and formed into a substantially circular ring which may have abutted ends that may be welded or otherwise secured together as desired. The ring so formed is peripherally expandable by separation of the abutment shoulder segments 26a and by separation of the abutment shoulder segments 27a, by virtue of the provision of the slits 32, so that the ring may be expanded over the head of the piston 12. Of course, if the abutting ends of the ring are not welded together then separation thereof will permit easy and convenient placement of the ring and the groove 11. Should those abutting ends be welded together then the expanded ring moved into the place of the groove 11 will contract pandable by separation of the abutment shoulder segments to seat therein substantially as shown in Figure 1.

It will be understood, of course, that variations and modifications may be effected without departing from the true spirit and scope of the novel concepts and principles of my invention. I therefore intend to cover all such modifications and variations as fall within the true spirit and scope of the novel concepts of my invention.

I claim as my invention:

1. In an oil ring assembly wherein a pair of rail rings are resiliently urged radially outwardly from an oil ring groove in a piston against a cylinder wall, an expander-spacer ring to support said rail rings in said groove and to radially outwardly bias said rail rings, said expander-spacer ring having integral peripherally-spaced rail ring supporting legs, axially spaced abutment shoulders and axial cross legs substantially as wide as the space between said supporting legs, said abutment shoulders being substantially continuous peripherally about said expander-spacer ring at the axial extremities thereof.

2. In an oil ring assembly wherein a pair of rail rings are resiliently urged radially outwardly from an oil ring groove in a piston against a cylinder wall, an expander-spacer ring to support said rail rings in said groove and to radially outwardly bias said rail rings, said expander-spacer ring having integral rail ring supporting legs, axially spaced abutment shoulders and axial cross legs, said supporting legs having a length substantially the same as the length of said cross legs and bent outward from between said cross legs, and said abutment shoulders being substantially continuous peripherally about said expander-spacer ring at the axial extremities thereof.

3. In an oil ring assembly wherein a pair of rail rings are resiliently urged radially outwardly from an oil ring groove in a piston against a cylinder wall, an expander-spacer ring to support said rail rings in said groove and to radially outwardly bias said rail rings, said expander-spacer ring having integral rail ring supporting legs, axially spaced abutment shoulders and axial cross legs, said supporting legs having a length substantially the same as the axial spacing between said abutment shoulders and bent outward from therebetween, and said abutment shoulders being substantially continuous peripherally about said expander-spacer ring at the axial extremities thereof.

4. In an oil ring assembly wherein a pair of rail rings are resiliently urged radially outwardly from an oil ring groove in a piston against a cylinder wall, an expander-spacer ring to support said rail rings in said groove and to radially outwardly bias said rail rings, said expander-spacer ring having integral rail ring supporting legs, axially spaced abutment shoulders and axial cross legs, said supporting legs lying in substantially parallel axially spaced transverse planes axially inwardly from said abutment shoulders a distance less than the thickness of said rail rings, and having free outer ends, and said abutment shoulders being substantially continuous peripherally about said expander-spacer ring at the axial extremities thereof.

5. In an oil ring assembly wherein a pair of rail rings are resiliently urged radially outwardly from an oil ring groove in a piston against a cylinder wall, an expander-spacer ring to support said rail rings in said groove and to radially outwardly bias said rail rings, said expander-spacer ring having integral rail ring supporting legs, axially spaced abutment shoulders and axial cross legs, said supporting legs lying in substantially parallel axially spaced transverse planes axially inwardly from said abutment shoulders a distance less than the thickness of said rail rings and extending radially outwardly to free outer ends, and said abutment shoulders being substantially continuous peripherally about said expander-spacer ring at the axial extremities thereof.

6. An expander-spacer ring to resiliently support rail rings in an oil ring groove in a piston and to resiliently bias the rail rings radially outwardly, comprising, integral spaced rail ring abutment shoulders, cross legs extending between said shoulders and rail ring supporting legs extending radially outwardly from said shoulders and cross legs bent from between said cross legs and having free outer ends.

7. An expander-spacer ring to resiliently support rail rings in an oil ring groove in a piston and to resiliently bias the rail rings radially outwardly, comprising, integral axially spaced rail ring abutment shoulders, cross legs extending between said shoulders and rail ring supporting legs extending radially outwardly from said shoulders and bent from between said cross legs, said abutment shoulders having an axial dimension less than the axial dimension of the rail rings and the supporting legs having a radial dimension less than the radial dimension of said rail rings.

References Cited in the file of this patent

UNITED STATES PATENTS

| | | |
|---|---|---|
| 2,220,948 | Paton | Nov. 12, 1940 |
| 2,346,898 | Bowers | Apr. 18, 1944 |
| 2,476,948 | Sanford | July 19, 1949 |
| 2,621,989 | Norton | Dec. 16, 1952 |
| 2,635,022 | Shirk | Apr. 14, 1953 |
| 2,676,076 | Hamm | Apr. 20, 1954 |
| 2,680,045 | Hamm | June 1, 1954 |